United States Patent [19]

Seiderman

[11] Patent Number: 5,388,148
[45] Date of Patent: Feb. 7, 1995

[54] CELLULAR TELEPHONE CALLING SYSTEM USING CREDIT CARD VALIDATION

[76] Inventor: Abe Seiderman, 165 Solano Prado, Coral Gables, Fla. 33156

[21] Appl. No.: 30,675

[22] Filed: Mar. 11, 1993

Related U.S. Application Data

[63] Continuation-in-part of Ser. No. 743,972, Aug. 12, 1991.

[51] Int. Cl.[6] .......................................... H04M 11/00
[52] U.S. Cl. ..................................... 379/59; 379/144; 379/357; 379/441
[58] Field of Search .................. 379/59, 91, 112, 132, 379/140, 141, 144, 357, 441, 442; 455/90

[56] References Cited

U.S. PATENT DOCUMENTS

| | | | |
|---|---|---|---|
| 4,718,080 | 1/1988 | Serrano et al. | 379/59 |
| 4,776,003 | 10/1988 | Harris | 379/144 |
| 4,845,740 | 7/1989 | Tokuyama et al. | 379/144 |
| 4,860,336 | 8/1989 | D'Avello et al. | |
| 4,965,821 | 10/1990 | Bishop et al. | |
| 4,975,942 | 12/1990 | Zebryk | 379/91 |
| 5,144,649 | 9/1992 | Zicker et al. | 379/144 |
| 5,189,696 | 2/1993 | Yoshida | 379/200 |
| 5,212,810 | 5/1993 | Maeda et al. | 379/200 |
| 5,247,160 | 9/1993 | Zicker | 379/91 |
| 5,272,747 | 12/1993 | Meads | 379/144 |

OTHER PUBLICATIONS

UNIDEN Communication Protocol for Cellular Phone, Sep. 4, 1990.
National Semiconductor GAL 22V10 Brochure.

*Primary Examiner*—Curtis Kuntz
*Assistant Examiner*—Dwayne D. Bost
*Attorney, Agent, or Firm*—Robert C. Kain, Jr.

[57] ABSTRACT

The cellular telephone credit card calling system works in conjunction with a cellular telephone, a local cellular network and an IXC in a telecommunications network. The cellular telephone has a handset and a transceiver unit coupled together by a power and a communications bus. A credit card interface unit is coupled to the bus. The interface unit has a credit card reader and an electronic system which initially validates the credit card. The cellular telephone also includes electronic circuitry which establishes a first telephone communications link with the network and transmits, via the transceiver unit for the phone, to the network, credit card data, a cellular telephone ID data and the telephone number input into the handset by the user. Upon receipt of at least the credit card data, a network transceiver verifies the validity of the user's credit card. After the credit card has been validated by the IXC through a verification or validation computer service, the network transceiver then completes a further telephonic communications link between the cellular telephone, operated by the user, and the telephonic device associated with the input telephone number, that is, the third party's telephone. Since the network transceiver does not complete the call to the third party prior to validation of the user's credit card, the system operates in real time. Further, in a preferred embodiment, the network transceiver provides some type of indication to the credit interface unit that the credit card has been validated. Thereafter, the user is permitted to make additional cellular telephone calls without requiring further validation of the credit card data by the network transceiver.

22 Claims, 8 Drawing Sheets

CELLULAR TELEPHONE CALLING SYSTEM USING CREDIT CARD VALIDATION

This is a continuation-in-part of U.S. patent application Ser. No. 07/743,972, filed Aug. 12, 1991, pending.

BACKGROUND OF THE INVENTION

The present invention relates to a cellular telephone calling system which verifies credit card data and charges the user's credit card upon completion of the telephone call to the third party.

U.S. Pat. No. 4,860,336 to D'Avello (herein D'Avello) discloses a cellular phone coupled to a credit card reader. A processor in the phone initially verifies the credit card information, i.e., expiration date etc. The phone has lighted indicators informing the user (a) to swipe the card through the reader, (b) to "Please wait," and (c) "Sorry." A visual display also shows "Hello." The processor determines if the new card data matches the last card validated by the unit. If so, the processor permits the user to call from the cellular phone. If the card data does not match, the cellular phone dials up a registration computer. A two way communications link is established, such that the registration computer validates the card, by checking the computer's data base, and then sends a validation code to the cellular phone. The registration computer, after validation or rejection of the card, disconnects the cellular telephone link with the phone. The cellular phone then permits the user to place as many phone calls as necessary. The cellular phone, before or after validation, permits 911 calls. The phone has an electronic lock-out which prohibits calls if a call timer limit is exceeded, if the car door is open or after a power-up of the phone (unless the card matches the last validated ,card). The phone can be programmed by the registration computer.

U.S. Pat. No. 4,965,821 to Bishop discloses a cellular phone installed in a rental car. The cellular phone has a credit card reader 234. The phone detects an open car door. The user selects a rental car and the phone issues visual indicators prompting the customer to insert his or her credit card. The phone initially validates the card, i.e., checks the expiration date. The phone also issues voice prompts to instruct the user regarding the steps to rent the car. The phone communicates with another computer via a cellular network. This computer validates the card and determines whether the car selected by the user conforms to a corporate profile stored in the computer. For example, is the user permitted to rent a luxury car, or has his or her company limited rentals to compact cars? After validation, the computer communicates with the processor in the phone and validates the transaction. The user drives the car to a booth at the exit of the lot and receives and signs a car rental agreement. This agreement is also electronically stored in the phone.

OBJECTS OF THE INVENTION

It is an object of the present invention to provide a cellular telephone and an associated calling system which verifies credit card information during a first portion of a telephonic communications link and then, after such verification, completes the call to a designated third party.

It is a further object of the present invention to provide a calling system whereby the user's credit card is billed for such completed calls.

It is another object of the present invention to provide a cellular phone calling system which verifies credit card data in real time.

It is a further object of the present invention to provide a calling system which, after initial verification of the credit card through a verification computer system, does not require additional credit card verification for subsequent telephone calls unless power is withdrawn from the phone unit.

It is another object of the present invention to provide a calling system whereby, once the cellular telephone user logs into the cellular network and his or her credit card is verified, third parties may call the user through the cellular network and such calls are billed to the user's credit card.

It is an additional object of the present invention to permit multiple credit card calls as long as the power is supplied to the cellular telephone.

SUMMARY OF THE INVENTION

This is a summarization of the functional specification of the present invention. Upon entering the rental car, the driver turns on the ignition. A voice prompt in the processor (located in a credit car interface unit between a cellular telephone handset and a corresponding transceiver unit)announces "Thank you for using Alamo Rent-a-Car." Each time the cellular telephone is powered up, this procedure occurs. The display on the interface is lit by an electroluminescence light including three flashing arrows indicating where the credit card needs to be swiped. At this stage, the customer can initiate one of four functions (represented by buttons on the interface):

A. FREE Call—911—Emergency.
A FREE pre-programmed 800 number customer service call to the rental car agency for assistance.
C. Auto redial which enables the user to activate the processor and redial the last destination telephone number until the connection is made, e.g., if a busy signal was encountered.
D. Provide instructions by issuing voice prompts to the user. These prompts are available in multiple languages to instruct the user regarding placement of a call.

At any time, the customer can swipe a credit card through the card reader in the interface. The processor captures and checks the credit card number and expiration date on track two of the card. The expiration date is verified by the real time clock coupled to the processor. More particularly, the processor in the interface conducts a Luhn check on the credit card data to determine if the card has been altered or forged. Further, the processor checks the expiration date of the card against a real time clock. This feature is important because if the card is not initially validated by the processor, the system rejects the card and eliminates the need for further validation of the credit card data at the telecommunications network.

If the processor determines that the expiration date or the card is not valid, it then issues a voice response advising, "Please swipe another card," and the three lighted arrows continue to flash. If the credit card is accepted by the processor, then the three arrows stop flashing and become permanently lit.

A voice prompt then advises the customer to dial a ten digit destination telephone number: 1+area code+-number. Upon inputting the destination telephone number, the processor immediately dials an 800 number (a call placement number) to a telecommunications network which includes h local cellular carrier and an IXC (most likely through a long distance carrier).

The telecommunications network includes a local cellular operating carrier (providing an initial link between the cellular phone and a telecommunications network), a dedicated direct line (800 phone line, sometimes referred to herein as a call placement number) and an IXC (Inter Exchange Carrier). The IXC is a company that receives calls, validates a credit card and proceeds to bill the credit card user. After the cellular phone is connected to the IXC during a first telecommunications link, the IXC, in three seconds, establishes a separate, supplemental data telephone link between the IXC and a credit card validation computer, e.g., a computer system owned by Control Data Corp. The validation computer system reviews its data base files to determine if the credit card is good. Thereafter, the validation computer approves or rejects the card. If approved, the validation computer sends, via the supplemental or data telecommunications link, an approval code (a three digit code) authorizing the use of the card. The IXC then accepts the code and stores the code in its memory along with the credit card data. See the Call Detail Record Table in the Detailed Description. The IXC then connects the cellular telephone with the destination telephone. This secondary link is a further telecommunications link between the cellular phone, the IXC and the destination telephone.

More particularly, upon initially completing the circuit between the cellular phone and the IXC, the IXC transmits a dial tone back to the processor. The processor then forwards a stream of information to the IXC. This information includes the identification (serial number) of the processor (a terminal ID number), the credit card number and the destination telephone number. The IXC places this information into memory and holds this information in the event additional calls are made by the user. The processor advises the customer that his credit card has gone out for validation. In particular, a card accepted or "PHONE USED" flag is transmitted by the processor before the credit card data. If the card accepted flag is high (indicating a previous validation by the IXC), the processor does not send the credit card data. See the Call Protocol Table in the Detailed Description. If the card accepted flag is low, the IXC submits the credit card for validation, to a validation service (normally a computer), and waits for the authorization number. Upon receipt of authorization, the IXC processes the designation number and the call is completed.

The customer can place additional calls by dialing his or her ten digit destination telephone number at which time the processor submits the ID of the processor (the TID) and the destination telephone number to the IXC. The IXC has retained the credit card number and the ID number of the processor. The time necessary to complete the circuit for a post-validation call is approximately half the original credit card processing time. This post-validation call procedure provides a major cost savings. As long as power to the processor has not been interrupted, it is not necessary to re-swipe a credit card.

The following is the functional specification of the third party call-in system. The customer informs the third party that "You can reach me by dialing a specified 800 number and when you hear a tone dial a ten digit number 1+area code+telephone number." The third party would dial the 800 number, hear a tone and then dial a ten digit number which would then dial up the processor in the vehicle. This occurs at the IXC. Earlier, the customer in the rental car would have swiped his or her credit card and initially placed the aforementioned call to the third party. By so doing, the user has put in memory at the IXC the processor ID number and the credit card number. This enables the third party to backtrack to the customer in the rental vehicle to complete the circuit back to the rental car customer. The time and charges can be recorded on the user's credit card that is being held in memory at the IXC.

The following is a generalized description of the system. The cellular telephone credit card calling system includes at least one a cellular telephone and a telephone network. The telephone network, which includes a local cellular network, one or more long distance carriers, various switches and an IXC, also includes a credit card verification system. As an example, the cellular telephone can be mounted in an automobile and used by one or more people renting the automobile. The cellular telephone has a handset and a transceiver unit coupled together by a power and a communications bus. A credit card interface unit is coupled to the bus. The interface unit has a credit card reader and an electronic system which initially validates the credit card, for example, by checking the expiration date data magnetically imprinted within the credit card. The cellular telephone also includes electronic circuitry which establishes a first telephone communications link with the telephone network and transmits, via the transceiver unit in the phone, to the network, credit card data, a cellular telephone ID data and the telephone number input into the handset by the user (sometimes referred to herein as the "input telephone number" or the "destination telephone number"). The network has a network transceiver (normally at the IXC) which receives the credit card data, the cellular telephone ID data and the input telephone number data. Upon receipt of at least the credit card data, the network transceiver verifies the validity of the user's credit card. After the credit card has been validated through a verification or validation computer service, the network transceiver then completes a further telephonic communications link between the cellular telephone, operated by the user, and the telephonic device associated with the input telephone number, that is, the third party's telephone. Since the network transceiver does not complete the call to the third party prior to validation of the user's credit card, the system operates in real time. Further, in a preferred embodiment, the network transceiver provides some type of indication to the credit interface unit that the credit card has been validated. Thereafter, the user is permitted to make additional cellular telephone calls without requiring further validation of the credit card data by the network transceiver. This significantly reduces the time of the cellular telephone call. In a working embodiment, the credit card data can be validated through the network transceiver in 30-60 seconds. After the validation at the network level, all subsequent calls by the user are completed in approximately 10-20 seconds. In order to establish this particular credit card cellular calling system, the user normally inputs the third party telephone number as a long distance telephone number. The credit card interface unit places a call to the network transceiver using a particular, predetermined call placement telephone number. In one embodiment, that predetermined call network telephone number is an 800 access number.

BRIEF DESCRIPTION OF DRAWINGS

Further objects and advantages of the present invention can be found in the detailed description of the preferred embodiment when taken in conjunction with the accompanying drawings in which.

DETAILED DESCRIPTION OF THE PREFERRED EMBODIMENT

The present invention relates to a cellular telephone calling system which has a credit card verification and billing component as part of the system.

Figure 1:
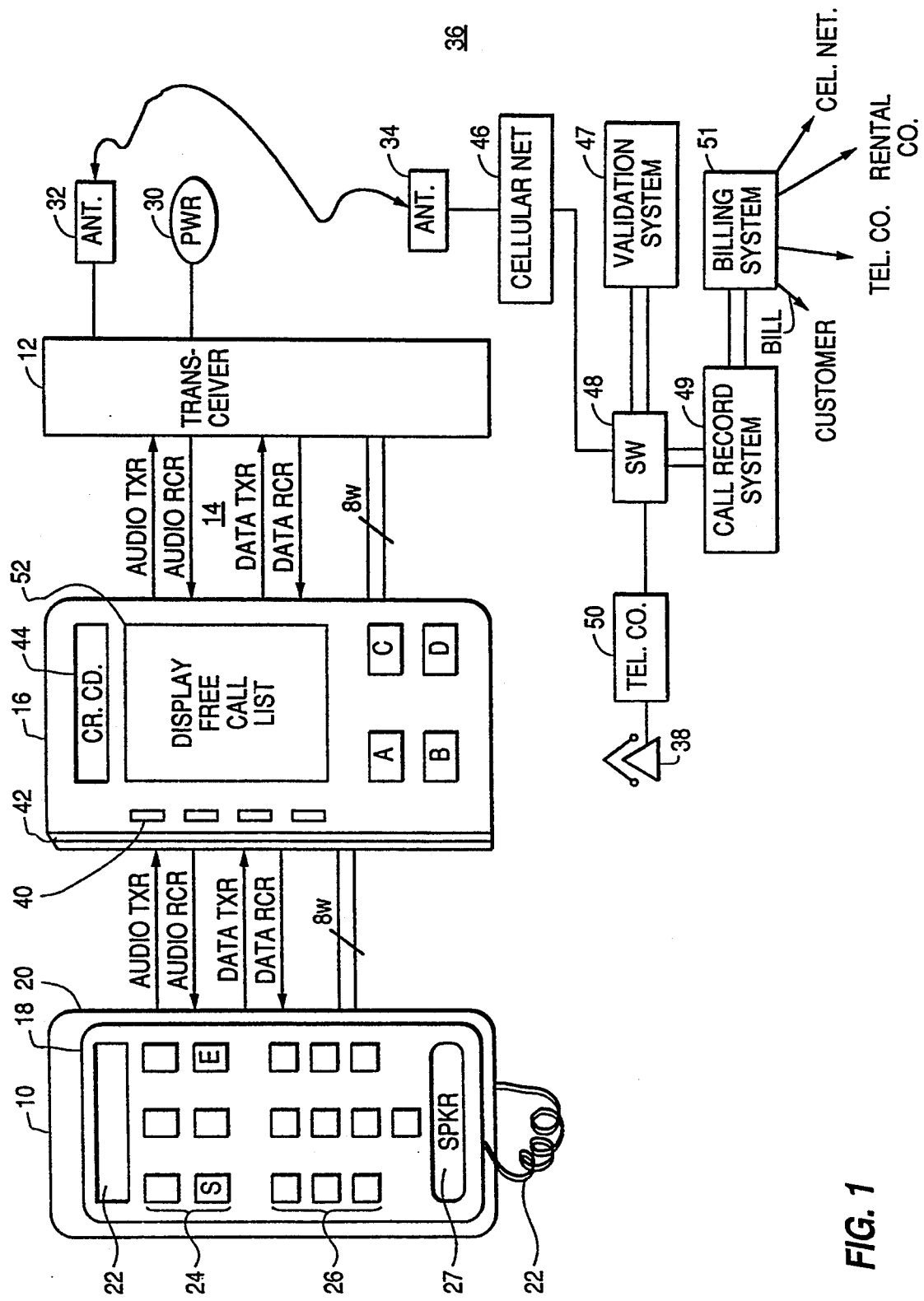
FIG. 1 diagrammatically illustrates the cellular telephone, credit card interface, cellular network and credit card billing system.

FIG. 1 diagrammatically illustrates the system which includes a cellular telephone having a handset 10 and a transceiver unit 12. In one working embodiment, a UNIDEN CP1500 cellular telephone is utilized. The CP 1500 cellular telephone is manufactured by Uniden America Corporation. Customarily, handset 10 and transceiver unit 12 are electrically coupled together by a communications bus 14. This hardware configuration is commonly used in conjunction with mobile cellular telephones. UNIDEN has established a particular communications protocol between handset 10 and transceiver unit 12. With respect to the UNIDEN telephone, this communications cable or bus 14 is a bundle of 14 wires consisting of audio transmission (TXR) wire, audio receive (RCR) wire or cable, data TXR and data RCR, power lines as well as the following cables or wires shown in the Pass Through Table below.

| PASS THROUGH TABLE |
| --- |
| Power (2x) |
| Ground |
| NX |
| NY |
| X1 |
| X2 |
| Hook |

A credit card interface unit 16 intercepts communications signals present on four of the 14 lines, that is, Audio TXR, Audio RCR, Data TXR and Data RCR, and obtains its power from the power line but otherwise passes through all the other supplemental communications and power cables or wires 8w between handset 10 and transceiver unit 12. The details of the interception of Audio TXR, Audio RCR, Data TXR and Data RCR are discussed later. The communications protocol and wiring system is believed to be functionally substantially similar in all mobile cellular telephones. Accordingly, the present invention is not limited to UNIDEN cellular phones. Also, the present invention can be embodied into a single unit, that is, an integral unit having a credit card reader, a transceiver and a credit card interface system to control the processing of the credit card calls.

In the working embodiment, handset 10 includes a hand held unit 18 which is electrically coupled to cradle 20 via spiral flex cord 22. Hand unit 18 includes, as is customary with most cellular or mobile telephones, luminescent display device 22, numerous function keys 24, and numerous telephone TOUCH-TONE type dial keys 26. Two function keys, the Send (S) key and the End (E) key are related to the cellular telephone calling system discussed herein. All cellular telephones have these function keys. Other than the features specifically discussed herein, the cellular telephone, which includes handset 10 and transceiver unit 12, is constructed as is customary in the industry and operates in the same manner as is customary in the industry.

As discussed in detail hereinafter, signals applied to the audio lines (Audio TXR and Audio RCR) are generally tone or DTMF signals, whereas electronic signals on the data lines (Data TXR and RCR) are digitally formatted. In order to describe the present invention, signals are referred with respect to handset 10 such that DTMF signals on Audio TXR are sent from the handset and most likely from hand unit 18 through credit card interface 16 and ultimately to transceiver 12. In contrast thereto, signals representing audible responses from the cellular network or voice prompts generated by credit card interface 16, are applied to the Audio receive RCR line leading to handset 10.

It is important to note that credit card interface 16 simply interrupts certain audio and data lines extending between handset 10 and transceiver unit 12 (in addition to tapping power from the powerline designated as part of 8w in FIG. 1). In other respects, the cellular telephone (handset 10 and transceiver 12) has not been modified in any manner. As is customary, transceiver unit 12 is ted power from power source 30 which, in the preferred embodiment, is a power source from an automobile.

As background, a cellular telephone operates in the following manner. In general, the user, after powering up the cellular telephone by depressing one of the function keys 24 on handset 10, would depress a number of telephone input keys 26. These key strokes would be displayed on luminescent display 22. Other operational data may also be displayed on display 22. However, the display principally shows the input telephone number. After visually confirming the input telephone number, the user will depress the Send or S key, which is part of function keys 24. Customarily, the cellular telephone will then be connected to a local cellular system and ultimately to the destination telephone. The telephone will send certain pieces of information to transceiver unit 12. This information includes a cellular telephone ID or identification number as well as the input or destination telephone number data. This information is converted to the appropriate radio frequency by transceiver unit 12 and applied to antenna 32. Antenna 32 then transmits the radio frequency signals to antenna 34 which is part of local cellular network or carrier 46.

According to the present invention, local cellular carrier 46 is electronically coupled and is part of the telecommunications network 36 that includes switch 48, telephone company lines 50 and call record system 49. Items 48 and 49 are embodied as an IXC in the present embodiment. The telecommunications network creates a call detail record for that telephonic communications link which includes credit card data, data representing the cellular telephone ID number (in order to bill the user), and may additionally include the destination phone number or the input telephone number. Ultimately, the telecommunications network connects the user through various telephone systems represented in FIG. 1 by TEL. CO. to a destination telephonic device 38 where the third party resides. Hopefully, the third party will answer the call and a telephonic communications link will be established between the user at handset 10 and the third party at destination telephonic device 38. Upon completion of the call (represented by a disconnect signal on the line), the telecommunications network will complete the call detail record which includes, among other things, the time, day and length of the call. The IXC will periodically (i.e. daily) rate the call detail records (convert the record into telephone call charges) and a bill for these charges will be created and processed through the system.

Most importantly in the present invention, interface 16 initially verifies the credit card data, then calls a particular IXC within the telecommunications network where the credit card data is further validated through a validation or verification computer system 47. Upon verification, which takes about 20–30 seconds, the telecommunications network (i.e., the IXC) then initiates a further telephonic communications link establishing a fully functional communications link between the user at handset 10 and the third party at destination telephonic device 38. Upon completion of this call, the telecommunications network (IXC) compiles the call detail record, rates the call and periodically generates a bill for the call on the credit card for the user. For all post-validation calls by the user, the system will not validate the user's credit card (as long as power is supplied to the phone). Further details of this system are discussed below with respect to FIGS. 2A, 2B and 2C.

An important feature of the present invention is the user-friendliness of the system. The system incorporates a voice synthesizer which prompts the user to do certain acts and informs the user of each step involved in placing and verifying the call. The system flow chart begins in FIG. 2A at initialization and power up start step 110. At voice response (VS) step 112, credit card interface 16 generates DTMF electronic signals and places those signals on Audio receive (RCR) line to handset 10. These DTMF signals are synthesized voice prompts which are played through speaker 27 in hand unit 18 such that the user is informed of certain system conditions. The following Voice Response Table shows an exemplary list of available voice prompts for the preferred embodiment cellular telephone calling system.

VOICE RESPONSE TABLE

0 Use your Visa, MasterCard, or American Express card.
1 Please contact card issuer.
2 Please swipe again now.
3 Unable to read magnetic stripe.
4 I am sorry.
5 Call cannot be completed as dialed.
6 Phone not equipped for International Calling.
7 To place your call
8 Dial area code + number for 7 digit local number.

-continued
VOICE RESPONSE TABLE

9 Welcome to
10 Rent-a-car
11 Thank you
12 One moment please
13 Your credit card information is being verified
14 Please send
15 Press End
16 Hertz
17 Dollar
18 Avis
19 National
20 Avon
21 Commercial
22 Enterprise
23 Freedom
24 We are experiencing difficulties
25 Try your call later As illustrated, voice response or VS step 112 informs the user as follows: "Welcome to Hertz Rent a Car. To place your call, use your Visa, MasterCard, or American Express card."

Of course, VS step 112 could refer to different rental companies, that his, voice responses 16, 17, 18, 19, 20, 21, 22, 23, or could refer to other companies programmed into credit card interface unit 16. The Voice Response Table identified above is only exemplary and shows the flexibility of the present system.

In step 114, interface unit 16 opens the Audio TXR and Data TXR lines extending from handset 10 to transceiver 12. When these lines are open, the user cannot place a call. Step 114 also initializes the circuits in the credit card interface 16.

Step 116 provides a visual prompt to the user to swipe his or her credit card. This visual prompt is a set of blinking lights one of which is light 40 on interface unit 16 in FIG. 1. The vertically aligned lights, e.g., light 40, blink sequentially and visually prompt the user to swipe his or her credit card through credit card reader slot 42 (FIG. 1). In addition, step 116 can provide a further voice response such as "Please swipe your credit card." This is identified in the step as VSn. The opening of the Audio TXR and Data TXR line between handset 10 and transceiver unit 12 prohibits the user from sending DTMF signals (from telephone number input keys 26) or data signals, particularly the Send signal (from function keys 24) to transceiver unit 12. In addition to the visual prompts (the blinking lights 40) and the audio prompts (VSn), credit card interface unit 16 has a display 44 showing what type of credit cards the unit accepts, that is, Visa, MasterCard or American Express. As an alternate embodiment, display 44 could be an electronic display unit that can be programmably altered. These features prompt the user, upon entering the rental car, to immediately insert his or her credit card into the interface, receive information regarding the type of card accepted by the system and receive information regarding the making of telephone calls. Additionally, due to the blocking of audio and digital signals from handset 10 to transceiver 12, the user cannot override the credit card interface system (explained below) without swiping or inputting his credit card data into the system.

Figure 2A:
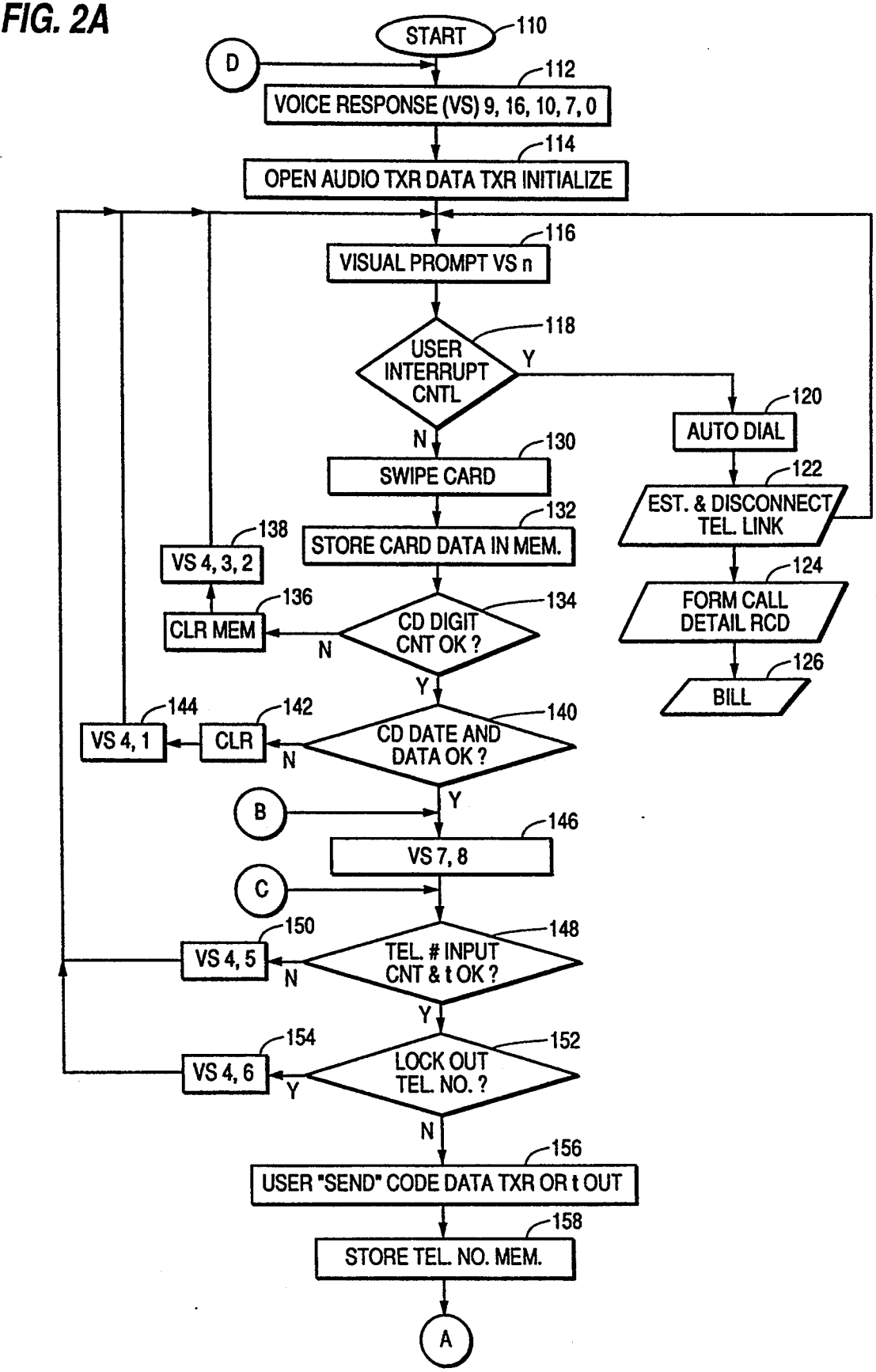
FIGS. 2A, B and C diagrammatically illustrate a flow chart of the system showing the steps for the cellular telephone credit card calling system.

Returning to the flow chart diagram of the system in FIG. 2A, decision step 118 determines whether the user has activated one of the free call interrupt controls identified as keys A–D on the face of credit card interface unit 16 (FIG. 1). The table which follows shows the function and the labels associated with the free call interrupt controls.

| FREE CALL CONTROLS | | |
|---|---|---|
| Push Button Id | Display Label | Function |
| A | Redial | Redials last telephone # |
| B | Press for Instructions | Voice Prompted Instructions |
| C | Customer Service | Calls Car Rental telephone # |
| D | 911-Emergency | Calls 911 |

As shown above in the Free Call Control table, the user can redial the last telephone number input (the input telephone number data), can obtain further voice prompts regarding instructions to use the cellular telephone credit card calling system, can directly call the rental company or can place an emergency 911 call. Functions C and D permit the user to bypass the credit verification features of the system and directly call a predetermined telephone number (the car rental company or company providing the credit card cellular service) or the 911 emergency operator. This feature is encompassed within auto dial step 120 in FIG. 2A. Step 122 occurs at cellular network 46 illustrated in FIG. 1. The cellular network, upon receipt of the car rental company phone number or the 911 emergency phone number, would pass that number through to switch 48, telephone company lines 50, and ultimately to the appropriate destination telephonic device 38. Since certain portions of the credit card calling system are implemented at cellular network 46 (FIG. 1), as compared to steps implemented by the credit card interface, the network steps are shown in the system flow chart (FIGS. 2A, 2B, 2C) as parallelograms. The establish and disconnect telephone link step 122 occurs at the network. In contrast, the auto dial step, represented by a rectangle, occurs at the cellular phone. The free call to the predetermined destination (car rental company) involves the following steps:

| CUSTOMER SERVICE ROUTINE | |
|---|---|
| 1. | Sense user activated free call control interrupt. |
| 2. | Retrieve rental car customer service telephone no. from memory. |
| 3. | Form telephone call file with telephone no. and TID and MID (for rental car co.). |
| 4. | Place call through cellular network. |
| 5. | At cell net, log call with TID and MID (car rental). |
| 6. | Connect with rental car co. |
| 7. | Disconnect. |
| 8. | At cell net, update call record. |
| 9. | Bill rental car co. for call. |

Upon activation of, for example, free call interrupt control C, credit card interface 16 retrieves the rental customer service telephone number from its memory. The interface then forms a telephone call file with either the predetermined call placement number for cellular network 46 (FIG. 1) or a predetermined free call number associated directly with the car rental company. As described in detail later, this telephone call file usually includes merchant identification number (MID), cellular telephone terminal identification number (TID), a destination telephone number (the car rental company number), and other data specifically linked to the credit card which is not used during the free calls.

In the current embodiment of the invention, the telephone call file for a free call formed by credit card interface 16 includes the call placement telephone number needed to reach a particular cellular network 46, the MID, the TID (cellular telephone ID), and the destination telephone number (rental car company). This information is transmitted via the cellular network RF link to the cellular network 46. At the network transceiver, the network compiles a call detail record as shown in step 124 in FIG. 2A. The call detail record (as explained in detail later), includes the MID, TID, destination telephone number (car rental company) and certain other time keeping information such as the time, day, and length of call. Upon completion of the telephone call as noted by the hanging up of the user (by depressing E, the End function 24 on handset 10), cellular network 46 completes the call detail record and rates the call by assigning a monetary value for the call. At cellular network step 126, a bill is produced and, in the working embodiment, sent directly to the car rental company. From the cellular telephone stand point, the system returns to visual prompt step 116. For emergency 911 calls, no bill is generated.

In addition to the free calls to the rental companies and 911 emergency calls, the user sees display 52 (FIG. 1) which reveals a further list of free calls. An exemplary Free Call List table is shown below.

| FREE CALL LIST | | |
|---|---|---|
| Speed Dial No. | Vendor | Type |
| 01 | Sands Point | Food |
| 02 | Sands Point | Golf |
| 03 | Sands Point | Tennis |
| 04 | Joe's Stone Crab | Food |
| 05 | Marriott Airport | Lodging |

Display 52 can be a physical display or an electronic display that can be altered by programming credit card interface 16. As shown in the Free Call List above, the user is given a speed dial number, a vendor and the type of goods or services provided by that vendor. Preferably up to 20 free call vendors can be listed in display 52. The Free Call List is an advertising device that (a) advertises goods and services offered by particular vendors; (b) provides additional financial revenue to the car rental company which carries the cellular credit card system; (c) provides cross-promotion of restaurants, hotels and tourist attractions; and (d) provides additional financial revenue to the cellular network implementing the credit card calling system. For example, if the user wanted to play golf, he or she would depress the "Recall" function key, depress 02 on telephone input keys 26 on handset 10 (FIG. 1), then depress function key SEND (S) in function group 24. The speed dial numbers for the vendors have been programmed into handset 10. Credit card interface unit 16 monitors the Audio transmission TXR line and detects a correspondence between the free call telephone number and the list of free call telephone numbers stored in its memory. Upon a positive comparison between the free call list and the memory of interface unit 16, interface unit 16 then initiates the telephone call. In the working embodiment, this call uses the call placement telephone number which dials into a particular cellular network. This call placement number in the working embodiment is an 800 long distance access telephone number. Upon clearance by the cellular network and the formation of a call detail record (the network recognizes free calls by a comparison routine), the cellular network 46 then completes the call to the destination in the free call list. The cellular network 46 further compiles a list of all free calls made by the user since each call detail record includes a cellular telephone ID (TID) and then can either bill the vendor on the free call list, the car rental company, or absorb the expenses for the cellular telephone call as a cost of doing business and obtain advertising revenue from the vendors on the free call list. Since most rental car customers rent cars in unfamiliar jurisdictions, these customers are provided with an easy way to use local goods and services. The flexibility provided by the present invention (the free call vendor list can be changed electronically by programming interface 16 via handset 10) enhances the overall commercial acceptance of the device. Further, car rental companies may offset some of the cost of the credit card calling system by collecting the advertising revenues from the vendors shown on the free call list.

Rather than program the speed dial memory in the handset 10 such that free call numbers are retrieved therefrom, the credit card interface may have its own speed dial memory. In this embodiment, the user would, for example, depress a "Free Call Activation" key on interface 16 (similar to interrupt controls A–D), depress the speed dial code on handset key pad 26, depress Send function key (pad 24) and the interface unit would then place the call to the vendor over the cellular network. In a further embodiment, interface unit 16 could include speed dial function keys.

Assuming that the user has not activated the free call interrupt controls or the free call list, the following occurs.

In the most ordinary case, the user would not activate the free call interrupt control or place a call to a vendor on the free call list. In such situations, the program follows the NO branch from decision step 118 to the swipe credit card step 130. To visually prompt the user, step 116 continues to flash sequential lights 40 in an effort to motivate the user to insert his or her credit card into the interface by sliding the magnetic strip of the credit card through reader track 42 (FIG. 1). Upon inputting the credit card data into interface 16, step 132 stores the credit card data in the memory of the interface. Decision step 134 is a card digit and count check. In other words, the interface initially verifies that the correct sequence of credit card data have been input and stored into its memory. In addition, decision step 134 determines whether the card data has been received within a certain frequency parameters (that is time parameters). If not, the NO branch is taken from step 134 and in step 136 the memory is cleared. Step 138 is a voice response VS step which informs the user "I am sorry. Unable to read magnetic stripe. Please swipe again now". The local program in the credit card interface unit 16 then returns to the visual prompt step 116.

If the YES branch is taken from decision step 134, in decision step 140, the interface unit 16 checks the credit card expiration date and data. For example, a Visa card may have a certain data format which differs from MasterCard, American Express etc. These formats can be confirmed against a memory check in interface unit 16. Further, the magnetic data stored on each credit card includes an expiration date. The interface includes a clock and a calendar system such that if the expiration date of the credit card exceeds the current date stored within interface unit 16, the NO branch is taken and memory is cleared in step 142. Again, a voice response step 144 informs the user that the card cannot be used by stating "I am sorry. Please contact card issuer." These voice responses are shown in the Voice Response Table above. Of course, additional voice responses could be provided to the user including a response that the credit card has expired and a request that the user insert another credit card into the system. From step 144, the program in the credit card interface 16 returns to the visual prompt step 116.

In one embodiment, the credit card interface processor is designed and engineering to read the entire Track II from Visa and MasterCard credit cards and pass it in an unaltered state to either the user's authorization database or it's agent. This data track on the card includes the CVC (Visa) and CVV (MasterCard) codes for consumer fraud, the expiration date, primary account number, service code field and pin verification fields. The interface processor maintains an internal clock that validates the expiration data information, and performs a Luhn or number sanity check to insure there are sufficient numbers in the account number field and that the proper algorithm has been employed. If it becomes necessary to read and analyze data on Track I or both Tracks I and II, the processor can be re-engineered to comply with the regulations.

In an ordinary situation, the credit card data would be initially validated by the credit card interface unit 16. This initial validation is a confirmation of the accuracy of receipt of the electronic data from the card, a correspondence or data format for a particular card, the time frequency for the receipt of the information, and the confirmation that the card has not expired. Voice response step 146 informs the user "To place your call, please dial the area code and the seven digit telephone number." The user inputs a long distance telephone number even though he or she wishes to make a local phone call. The reasons for the input of a long distance phone number is discussed hereinafter. Decision step 148 determines whether the telephone number input into the credit card interface 16 is correctly input by checking the time receipt of that information (t) and determining whether the user has in fact input the telephone number as a long distance phone call. If the NO branch is taken from step 148, voice response step 150 informs the user that the call cannot be completed as dialed. See Voice Response Table items 4 and 5. If the YES branch is taken form decision step 148, decision step 152 determines whether the input telephone number data corresponds to a lock out telephone code. The following Lock Out Call Table shows various lock out telephone codes.

| LOCK OUT CALL TABLE |
|---|
| 011 (International) |
| 10 (International) |
| 976 (Bill caller) |
| 1-976 (Bill caller) |
| 1-900 (Bill caller) |

For example, the present system does not allow the user to dial an international call or to dial a telephone call which bills the caller. The interface unit 16 can be programmed by activating telephone key pad 26 in handset 10 thereby changing the lock out call table to add new lock out call or delete certain lock out call. Interface 16 can be programmed by inputting a special key code into the handset. The interface monitors the Audio TXR line and, upon receipt of the DTMF signals representing the key code, permits the programmer to change the lock out codes, free call list call placement number, and other critical but variable data in the system. The phone controller or interface permits programming regarding the following features: restricted phone number (such as 976's, 900, etc. can be accepted or rejected by the unit); IXC or call placement phone numbers; and the order in which the stream of characters are sent out to the telecommunications network, particularly the IXC.

For instance, in a second working embodiment, the credit card number followed by the destination number is sent out in a single stream of characters. This communications protocol is different than the protocol generally described herein in which the stream of characters is partitioned into three segments: phone identification number, credit card information, and destination phone number. Furthermore, in the second embodiment, the user is required to slide his or her credit card through the cellular phone card reader prior to every call made. These changes were made by modifying the program installed in the credit card interface or phone processor. These changes were easily implemented because of the flexibility obtained my making the unit fully programmable.

If the YES branch is taken from decision step 152, the user is informed that his or her call cannot be completed in voice response 154. See Voice Response Table items 4 and 6. If the NO branch is taken from decision step 152, the user in step 156 strikes the Send (S) key in function key pad 24 of handset 10. This Send key electronic code is placed on the Data TXR line by handset 10. Alternatively, interface 16 could monitor Audio TXR and determine by a time out routine that the user wants to place a call after entering the long distance destination number into the handset. In this situation, it is not necessary to depress the Send key. As is customary in the industry, the input telephone number has been placed on the Audio TXR line by handset 10. Credit card interface 16 also provides an echo of the input telephone number which is applied, as is customary in the industry, on Audio receive RCR line. In step 158, the input telephone number data is stored in the memory of credit card interface 16.

Figure 2B:
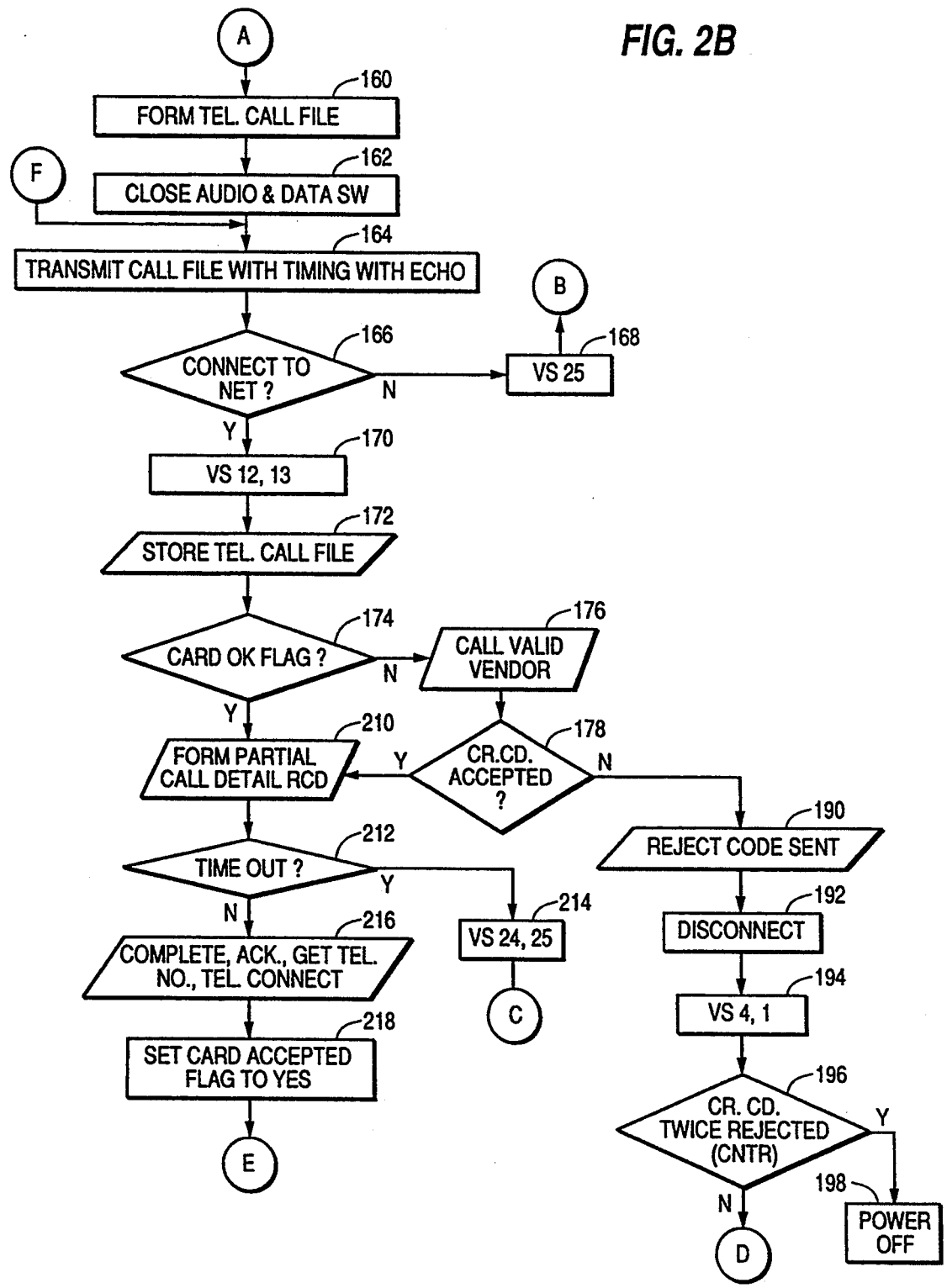
Figure 2C:
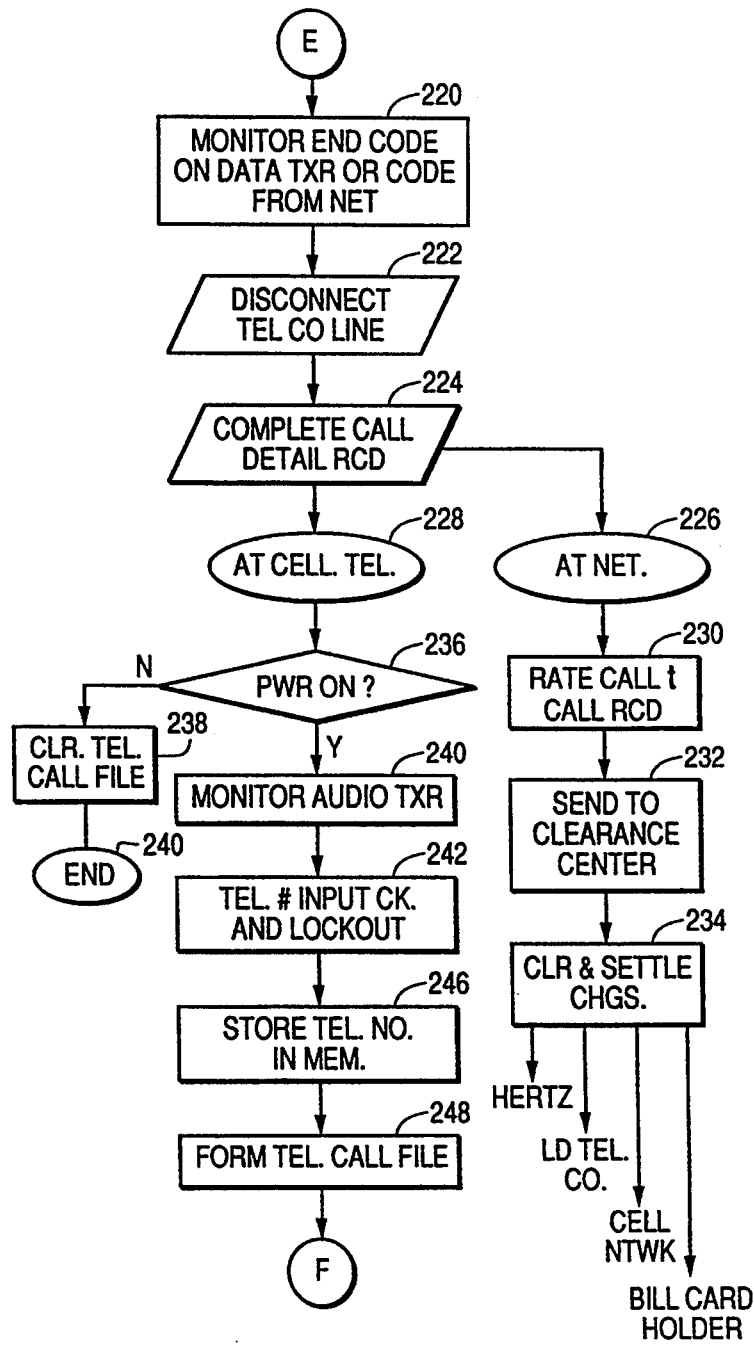

The system flow charts shown in FIGS. 2A, 2B, 2C are linked together by jump point A shown in FIGS. 2A and 2B and, particularly, jump point E shown in FIGS. 2B and 2C. Other jump points return to intermediate steps and are identified in the figures as jump points B, C, D, and F.

In FIG. 2B, interface unit 16 forms a telephone call file in step 160. The following table shows the telephone call file in a working embodiment.

| TELEPHONE CALL FILE |
| --- |
| 800 LD Access # (AT&T; MCI; Cellular World) |
| MID (Merchant Id#) |
| TID (Terminal Id#) |
| Destination Tel # |
| CR CD Data |
| Card Accepted Flag (YES/NO) |

In the working embodiment, the telephone call file uses a predetermined call placement number which is an 800 long distance access number through a cellular telephone network to an IXC in a telecommunications network which is identified in the industry as Cellular World. Since certain components of the cellular telephone credit card system include processing data at the telecommunications network (particularly the billing of the user's credit card), in the working embodiment, all calls in the system are placed to one predetermined call placement telephone number. However, if several cellular networks participated in the system, different call placement numbers would be used. As discussed later, all calls placed to a designated telephone by the user are, in fact, placed with the call placement telephone number unique to a certain IXC in a telecommunications network. The telephone call file formed by interface 16 also includes cellular telephone ID data which is similar to or equivalent to the terminal ID (TID) customarily associated with credit card purchases in the consumer transaction industry. The merchant ID (MID) may designate the car rental company, or other entities which will be compensated by the bank for the credit card call. The cellular telephone ID number is similar or identical to the terminal ID number (TID). In the credit card transaction industry, the TID is normally associated with a particular terminal which verifies credit card data.

In the working embodiment, the IXC electronically submits the credit card transaction data with the TID, MID, credit card number and validation approval code to the user's bank or credit card issuer. The credit card issuer pays the network which in turn pays various entities, such as the car rental company, the local cellular phone network, etc. Since the call placement number is an 800 long distance access number, the calling system works throughout the U.S. Since long distance access procedures normally require the user to input an area code to call a particular destination, the present system utilizes these features and requires the user to dial an area code even though he or she wants to make a local call.

The destination telephone number is the equivalent of the input telephone number data input by the user using the telephone key pad 26 in handset 10 of FIG. 1. The credit card data stored in the telephone call file represents the data obtained from the credit card by the credit card reader and interface 16. The credit card accepted flag is a positive or negative statement (YES/NO) which indicates whether the credit card has been validated through the validation system described hereinafter and associated with the telecommunications network. Initially, the credit card accepted flag is set to NO as part of the initialization step 114 in FIG. 2A.

Step 162 closes certain audio and digital communications paths between handset 10 and transceiver 12. Step 164 transmits the call file from interface 16 via transceiver 12 to telecommunications network. As is customary in the industry, the transmission of information is echoed by transceiver 12 back to display 22 in handset 10. The Audio RCR and Data RCR signal paths are closed to produce this echo. Accordingly, the user is informed that (a) the cellular phone has dialed the particular call placement telephone number unique to a certain IXC in a telecommunications network, (b) the MID and TID have been sent, and (c) the credit card data has been sent to the network. Decision step 166 determines whether the first telephonic communications link has been established between the cellular telephone (consisting of handset 10, transceiver 12, interface 16) and the IXC in telecommunications network. If the NO branch is taken from decision step 166, voice response step 168 indicates to the user that he or she must try the call later. The local program in the interface unit then jumps, via jump step B, to the voice response step 146 which again informs the user to place the call through the system using a long distance phone number. The destination telephone number is removed from the call file memory.

If the YES branch is taken from decision step 166, voice response step 170 informs the user that his/her credit card information is being verified by the network. As stated earlier, the parallelogram about step 172 indicates that the IXC in telecommunications network executes the step. At that network, certain information is stored for processing. Network decision step 174 determines whether the card accepted flag is set YES or NO. Network decision steps are shown as having a double line on the right side of the decision diamond. Local decisions made by the cellular phone are shown as single line diamonds.

In the working embodiment, a certain communications protocol has been established between the cellular telephone and the cellular network. The Call Protocol Table shows that communications protocol.

---
CALL PROTOCOL TABLE
---
1. Dial predetermined cell net number.
2. Handshake (acknowledge, no ack., retry).
3. Send cell. phone id. (TID).
4. Handshake
5. Send cr. cd. data and card accept flag
6. Handshake (ack. only if card validated or if flag YES)
7. Send destin. tel. #
8. Handshake
9. Establish comm. link with destin. tel.
---

As is shown in the above table, the cellular telephone calls the telecommunications network using the determined call placement telephone number. The network provides a handshake which is basically an acknowledgment (Ack.) that the first telecommunications link has been established between the network and the cellular telephone. If the network has not accepted the placement number, the network sends a NO acknowledgment signal and the cellular phone retransmits the information at least once. In step 3 of the protocol, the cellular telephone sends the cellular telephone ID to the cellular network. This ID at least includes the TID and may further include the MID. The network then provides a handshake (an acknowledgment or a NO acknowledgement) and then, if acknowledged, the phone sends the credit card data and the card accept flag. The card accept flag, as stated above, is either YES that the card has been previously accepted or NO the card has not been previously accepted. The card accepted flag is sometimes referred to herein as the phone used flag. The network then acknowledges receipt of that data if the card accept flag is set to YES.

If the card accept flag is set to NO, the IXC in the telecommunications 47 network, before sending the acknowledgment (step 6), calls a validation vendor system in step 176. The NO branch is taken from network decision step 174. After calling the validation vendor (step 176), which is normally a computerized credit card validation service, network decision step 178 determines whether the credit card has been accepted by the validation vendor's computer. In other words, in the credit card transaction industry, there are completely computerized credit card validation services that validate credit cards in real time. The telecommunications network described herein electronically calls one of those credit card validation services and obtains verification of the validity of the credit card before completing the second portion of the telephonic communications link to the third party. This is a supplemental data telecommunications link.

Figure 3:
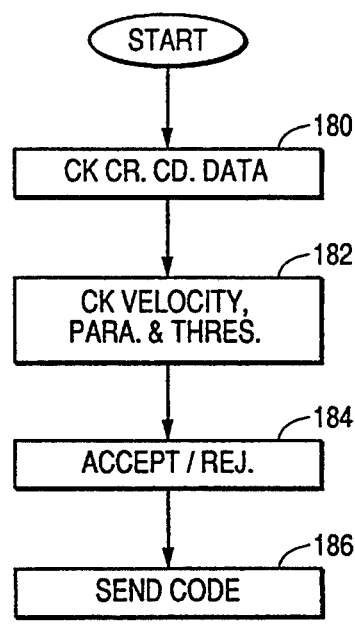
FIG. 3 diagrammatically illustrates a credit card verification routine to positively verify credit card data at the cellular network and by the validation system.

FIG. 3 shows a brief flow chart of this type of validation. In step 180, the basic credit card data is checked by the validation computer system. For example, is the credit card a valid Visa credit card with the correct numbers? Has the credit card been reported stolen? Step 182 determines the velocity of use (the number of times per predetermined period that the credit card user has used the credit card, e.g., more than 30 times per day), whether the credit card use falls within certain parameters and exceeds certain thresholds. For example, a validation service may determine that, once credit has exceed a $1,000.00 spending parameter through multiple transactions over a one day period, the credit card user will be called by the credit card company. In step 184, the credit card validation service either accepts or rejects the credit card. In step 186, that acceptance or rejection data is sent back to the IXC in telecommunications network (FIG. 1). This may be an approval code.

The interface processor is configured to interface with specific authorization and validation vendors to receive an "OK TO USE" approval code prior to completing the first call between the user and the destination phone. Initially the credit card will be employed as the payment option which requires an authorization vendor (ultimately Ceridan TeleMoney) to provide the proper fraud control mechanisms for the system and to insure that a timely response to the IXC's validation request is received by the processor (in the form of an acknowledgment). As the calling system expands, other third party validation communication networks will be employed to secure the proper validation to approve the credit card track environments for other payment options.

Network decision step 178, upon receiving the rejection code from the credit card validation company, follows the NO branch and enters network step 190. A reject code is noted and this data is linked with the credit card data in call detail record file formed at the network. The network then refuses to send the acknowledgment to the cellular phone, noted as step 5 in the Call Protocol Table, and after a certain time out period (for example, 30 seconds), interface unit 16 disconnects the first telephonic communications link between it and the network in local step 192. Thereafter, interface unit 16 executes voice response step 194 which informs the user that he or she must contact the credit card issuer. As part of the initial validation at interface unit 16, the interface unit may also execute decision step 196 which determines whether the credit card number input by the user has been twice rejected by the IXC in telecommunications network. If it has, the YES branch is taken and the system powers down in step 198. Steps 196 and 198 are optional. If the NO branch is taken, the local program in interface unit 16 passes to jump point D which precedes voice response step 112 (the initial voice response step) in FIG. 2A.

Again assuming that the credit card has been accepted by the validation service and by the network (network decision step 178), the YES branch is taken and the network executes step 210, wherein the network forms a partial call detail record. Returning to network decision step 174, if the card accepted flag code is YES or high (from the phone), the YES branch from that decision step also leads to network step 210 forming the partial call detail record file. The Call Detail Record Table which follows shows the information present in the call detail record.

---
CALL DETAIL RECORD TABLE
---
MID
TID
Destin. tel. #
CR CD Data
Authorization Code
Time, Day
Length
Cost
---

In interface 16, local decision step 212 determines whether an excessive amount of time has passed (a time out function) since the cellular phone sent the credit card data (step 5 in the Call Protocol Table) to the network. If so, the YES branch is taken and voice response step 214 informs the user that the system is experiencing difficulties and requests the user to try the call later. The local program in interface 16 then jumps to jump point C in FIG. 2A which precedes local decision step 148. If the time has not run out in local decision step 212, the IXC in telecommunications network in network step 216 completes the first portion of the call, sends an acknowledgment or handshake (step 6—Call Protocol Table) and obtains the destination telephone number (the input telephone number data) from credit card interface unit 16 via transceiver 12 (step 7—Call Protocol Table). Since the credit card has been invalidated in accordance with standard credit card validation procedures (through a validation computer system), the call detail record is updated to log in the authorization code obtained from the validation system. In addition, the time and day of the call is noted in the call detail record, as well as the start time of the call. At the local level in interface unit 16, step 218 sets the card accepted flag to YES. This occurs based upon the acknowledgment from the network in step 6 in the Call Protocol Table. In other words, the IXC in the telecommunications network would not acknowledge the credit card and request the sending of the destination telephone number unless the credit card has been independently validated through the validation computer system. After local step 218, the flow chart goes to jump step E in FIG. 2C. Local step 220 monitors Data TXR line and the user such that when the user presses the End E function key (function key pad 24) on handset 10, interface 16 notes the end of the call. An electronic signal is placed on Data TXR commensurate with the End call signal made by the user's depression of key E. Network step 222 then disconnects the telephone call. Optionally, the IXC in the telecommunications network senses a disconnect tone on the line. Thereafter, the IXC will send a disconnect signal to the interface. The interface 16 will decode the signal and disconnect the cellular link with cellular network 46 without depression of the End Key. This reduces cellular network time.

In network step 224, the telecommunications network completes the call detail record. The call detail record includes the total length of the call. The IXC in the network rates this call and includes a dollar amount to be charged to the user's credit card. After network step 224, the system flow chart separates such that the path below circle 226 occurs at the cellular network, whereas the path below circle 228 occurs at the local cellular telephone.

At the network (circle 226), the call is rated in step 230. This rating can occur in the call record system 49 shown in FIG. 1. In FIG. 1, the communication between the telecommunications network and the credit card validation system 47 is shown by double lines extending from switch 48 to validation system 47. Network step 232 sends this credit card charge to a credit card clearance center. These clearance centers (shown by double lines leading to billing system 51 in FIG. 1 ) are well known in the credit card transaction industry and are available to electronically process this financial information for many types of credit card vendors. The electronic sending of the credit charge information to the clearance center is represented in FIG. 1 by the double line extending between call record system 49 and billing system 51. Returning to FIG. 2C, network step 234 clears the credit card charges and settles those charges by billing the user's credit card, and transmitting funds to the appropriate entity.

Particularly, after the call is completed, the IXC in the telecommunications network tabulates or rates the call. If additional calls are made by the user, these call are fed through the IXC, logged with the user's credit card and rated. At the end of the day, the IXC batches the call record data for all users and submits the data to MasterCard, Visa, American Express etc. for payment.

At that time, payment is made by the credit card companies to the operator of the system, i.e., the company who leases the IXC, the 800 call placement number and contracts with the car rental company to install the cellular phones made in accordance with the principles of the present invention.

At the end of each month, the operator of the system receives bills from the local cellular carrier for all air time used in conjunction with certain cellular phone IDs (TIDs), from the lessor of the 800 call placement number, from the IXC for data management services and from the validation company. The latter bill is based upon the dollar amount validated by the service. The operator of the system then pays these bills.

Returning to the local cellular telephone (circle 228), at local decision step 236, a determination is made whether the power is still being supplied to the cellular telephone. If the NO branch is taken, step 238 clears the telephone call file and step 240 is the end of the local program. If the YES branch is taken, step 240 monitors the Audio TXR line from handset 10 to interface 16. If the user wants to place another call from telephone key pad 26, the DTMF signals will appear on the Audio TXR line. In step 242, interface unit 16 determines whether the input telephone number data conforms to frequency and format (long distance format) and whether the number is a locked out telephone number. In step 246, the newly input telephone number is stored in memory and in step 248 a new telephone call file is formed. Of course, since the credit card data has already been initially locally validated by interface 16 and then subsequently validated prior to completion of the first call by the telecommunications network, the telephone call file stored in interface 16 has the card accepted flag set to YES. Since the card accepted flag is set to YES, actual validation of the credit card by the telecommunications network is not necessary. Accordingly, the local program in interface 16 jumps, via jump point F, to FIG. 2B the transmit call file with timing and echo step 164.

To summarize these major features, the interface unit initially places a call to a specific IXC in a telecommunications network. At the telecommunications network, a protocol has been established such that the cellular telephone will send the network transceiver the cellular telephone ID number (TID) and credit card data. Thereafter, the telecommunications network then calls a credit card validation service to determine, in real time, whether the credit card data is valid and acceptable. Once the credit card data has been validated by the validation and verification service computer, the telecommunications network then obtains the input telephone number from the cellular phone and establishes a further telephonic communications link between the cellular telephone and the telephonic device corresponding to the input telephone number. This is very different from other prior art cellular telephone credit card calling systems.

In the prior art systems, the communications link between the telecommunications network computer or switch and the user of the cellular telephone is disrupted or broken after the initial verification of the credit card. Thereafter, the cellular telephone user must make a second, independent telephonic communications link with the destination telephone device.

Figure 4:
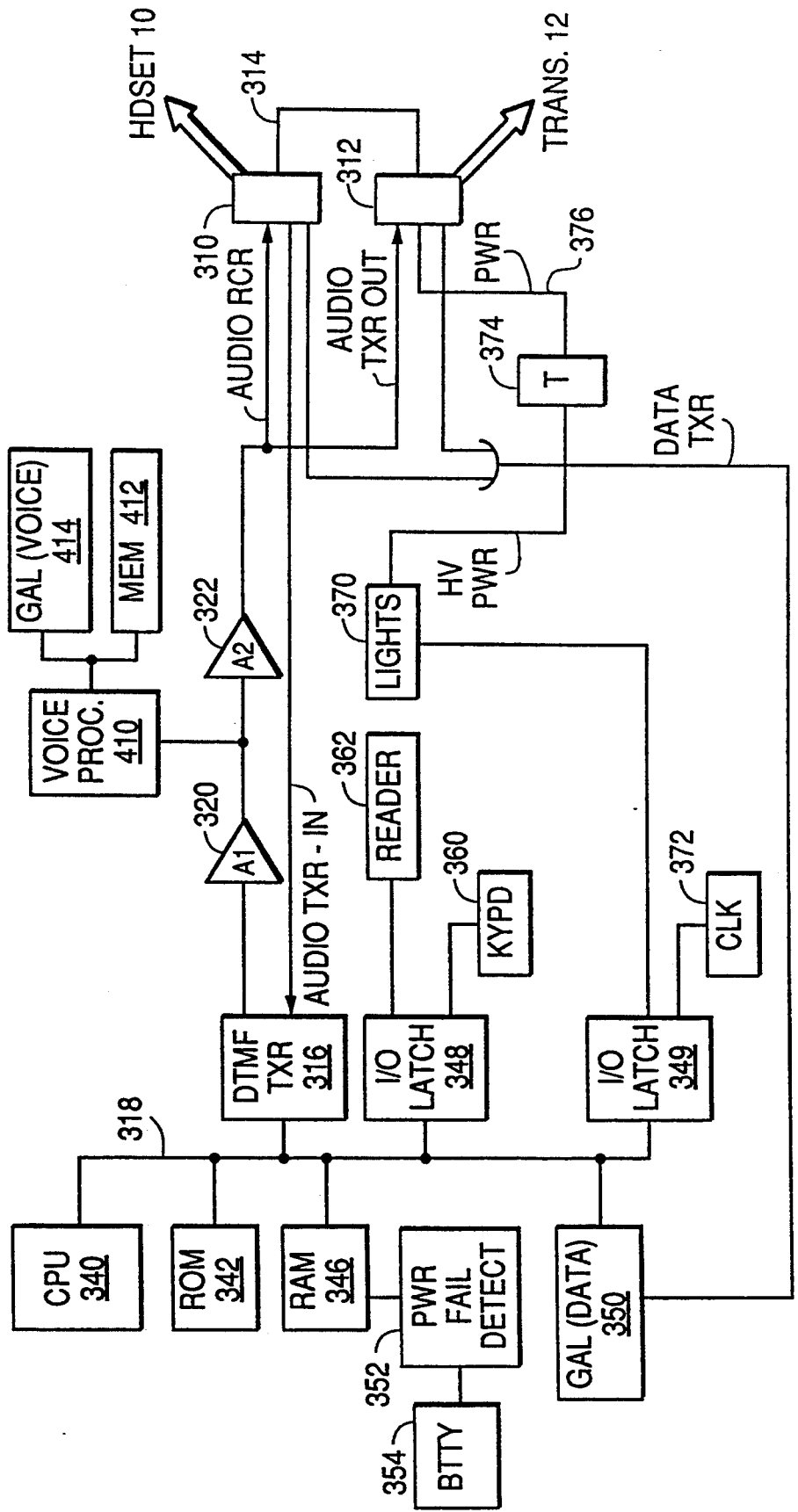
FIG. 4 diagrammatically illustrates the major components in the credit interface unit.
Figure 5A:
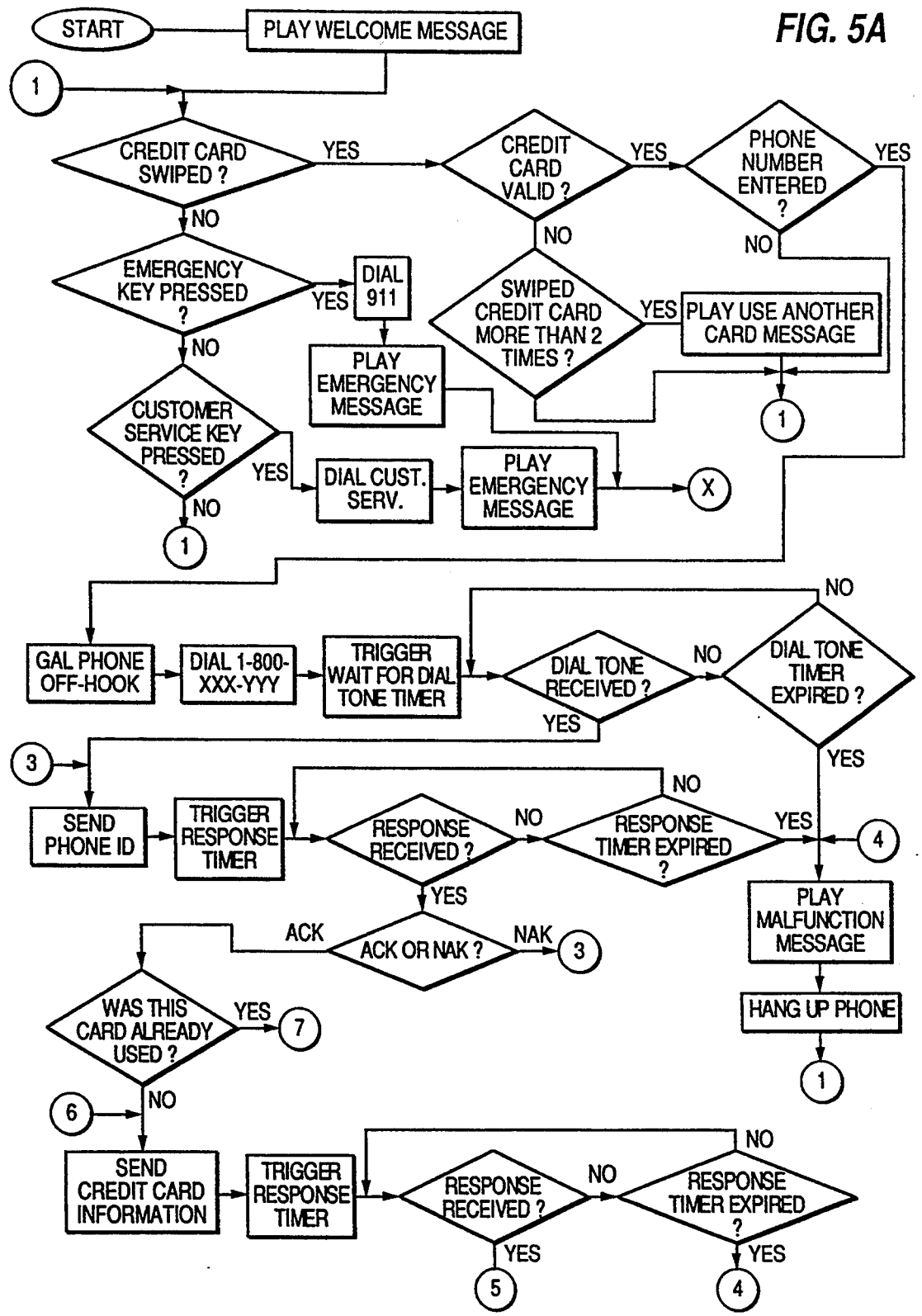
FIGS. 5A and 5B illustrate a detailed flow chart of the interface program.
Figure 5B:
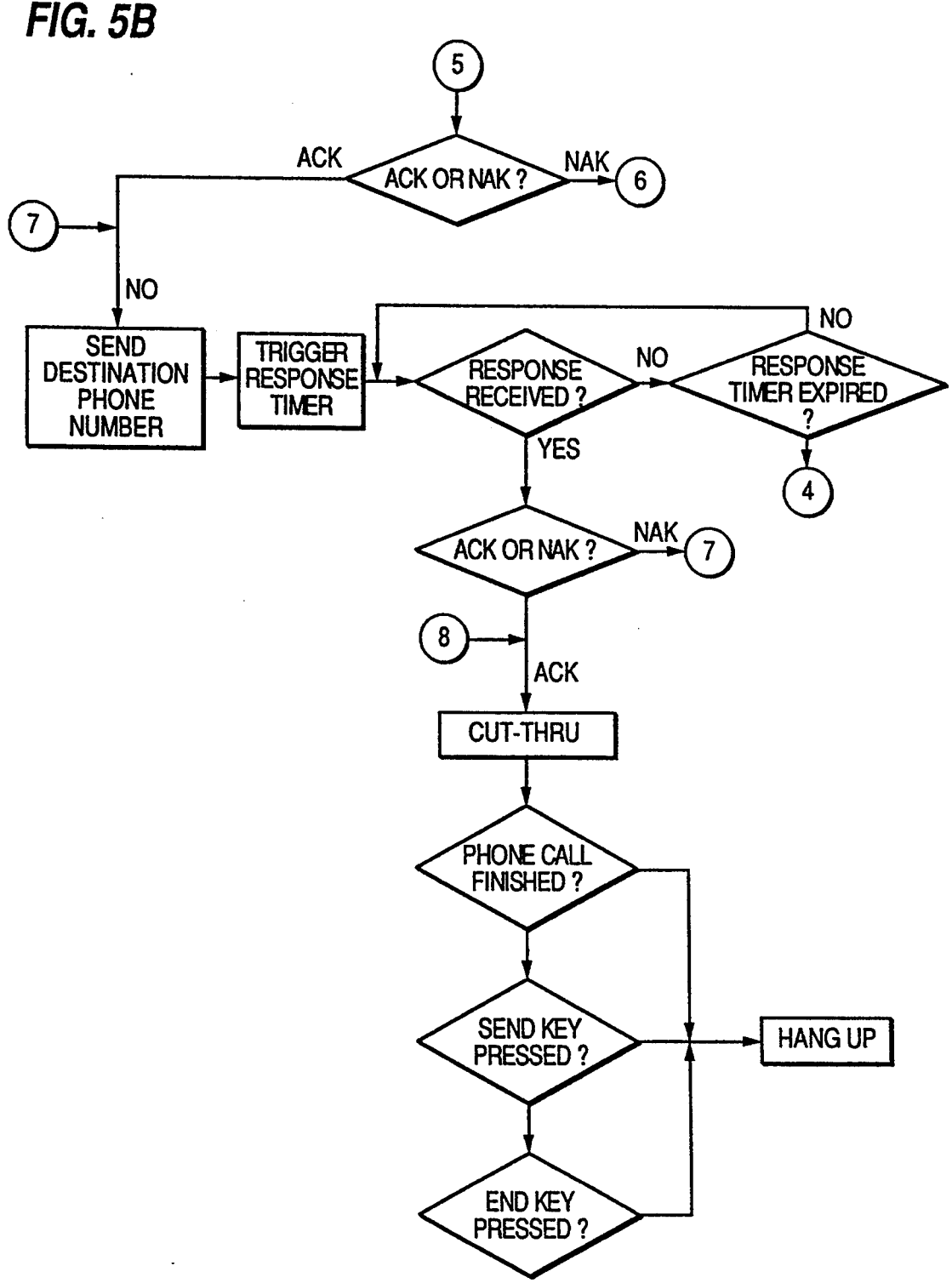

FIG. 4 diagrammatically illustrates the major system components of credit card interface unit 16.

The credit card interface unit 16 includes pin connectors 310 and 312 respectively coupled to handset 10 and transceiver 12. Jumper 3 14 indicates that the 8 lines or wires 8w (FIG. 1) are directly connected to handset 10 and transceiver 12. Please refer to the Pass Through Table set forth above. The Audio TXR-IN signals are fed to a DTMF transceiver. The DTMF transceiver initially decodes the DTMF signals into digitally formatted signals and applies the same to bus 318. DTMF transceiver 316 also is capable of converting or encoding digital signals obtained from bus 318 into DTMF outputs which are applied to amplifiers A1 and A2 (amps 320 and 322). These amplified signals, particularly the amplified signals from amplifiers 322 are fed to the Audio RCR line of the handset via pin connector 310 (as an echo) and applied to Audio TXR line (the Audio TXR-OUT) and pin connector 312 leading to transceiver 12. The Audio RCR is an echo function since the Audio TXR-OUT is fed directly to the transceiver. The DTMF transceiver is sold under model 75T2090.

The digitally formatted signals from DTMF transceiver 316 are processed by processor or CPU 340 which controls read only memory 342, random access memory 346, DTMF transceiver 316, input/output latch or buffer device 348, GAL programmable logic device 350 and input/output latch 349. The CPU is a microcontroller manufactured by Toshiba as TMP84C013A. A Zilog microprocessor can also be used, particularly model 84C013. Bus 318 is a 8 bit bus operating at a speed of 6 MHz. RAM 346 in the working embodiment is a 32K byte RAM and ROM 342 is a 32K EPROM. GAL 350 is a programmable logic device manufactured by National SemiConductor. Particularly, a GAL 22V10 is used. This programmable logic device or GAL has 22 inputs and 10 outputs. The GAL blocks certain signals and enables memory coding and decoding and further enhances the processing of signals and data, thereby reducing the need for extensive processing by CPU 340. ROM 342 stores the initialization program for the system. A power fail detect circuit 352 is coupled to RAM 346 as is a small back up battery 354. In the event power to the cellular phone is lost, power detect circuit 352 is activated which provides enough voltage to RAM 346 to store critical data. The storage of data is used to enable a programmer to change the pass word or the defaults such as removing the electronic locks for transmitting certain telephone numbers. Please refer to the Lock Call Table above.

Input/output latch 348 is sold as a 74HC245 bidirectional buffer. As such, it handles the input and output of data in two directions. I/O latch 348 is coupled to the key pad 360 (user actuation keys A-D) and the credit card reader 362. Returning to GAL 350, the GAL acts as a converter to sense the Send key electronic signal and End key electronic signal on the Data TXR line. GAL 350 also generates those signals and applies the same to transceiver at certain occurrences as described above. For example, when the call placement telephone number is sent via DTMF transceiver 316 to transceiver 12, GAL 350 sends the electronic code representative of the "Send" function key to transceiver 12. Accordingly, transceiver 12 believes that it is communicating directly with handset 10 rather than interface unit 16.

A second input/output latch 349 is coupled to internal bus 318. Input/Output latch 349 is sold as model 74HC373 an acts as a latch to control lights 370 and an input/output device for clock 372. Lights 370 are supplied by a high voltage transformer 374 which converts the 12 volt power signal from power line 376 into a 200 volt peak to peak high voltage signal to drive lights 370. Since lights 370 flash in a sequential manner to prompt the user to slide his credit card through reader 362, I/O latch 349 in conjunction with CPU 340 and ROM controls the sequential driving of those lights.

In order to produce the voice prompts, credit card interface 16 includes a voice processor 410. In the working embodiment, voice processor 410 is a Toshiba Voice Recording unit TC8830F which permits voice recording and play back using adaptive voice modulation. Voice processor 410 is a processor which encodes, decodes and enables voice recording into memory 412. Memory 412 is sufficient to record 4M bits which is equivalent to approximately eight minutes of speech. In the working embodiment, memory 412 is a read only memory but may be configured as a random access memory. GAL 414 is used for memory encoding and decoding and to provide additional addressing of the memory. GAL 414 enables decoding of certain address lines and interleaving of data into the CPU cycle. In the working embodiment, the voice processing and synthesis circuit (including processor 410, GAL 414 and memory 412) is placed on a separate circuit board as compared with the other components as shown in FIG. 4. Of course, the components shown in FIG. 4 must be supplied power which is obtained from an appropriate transformer not shown in the drawings but known to persons in the ordinary skill of the art. The transformer is coupled to power line 376.

Because of the flexibility of the system, the present cellular telephone calling system also enables third parties to call the user after the user has logged into the cellular network. Although this seems to be quite simple, in fact, the user's credit card are billed for this third party call. This is dissimilar to other calling card systems. The Third Party Call Table shown below exemplifies this feature.

THIRD PARTY CALL TABLE

1. User calls third party (after credit card validation) and provides third party with cellular telephone number and special network number (800#)
2. Disconnect
3. Third party calls network number
4. Voice or tone prompts third party to input user's cellular phone number
5. Call detail record file formed at network
6. File linked to user's credit card number
7. Network completes telephone communications link with user and third party
8. Disconnect
9. Network completes call detail record file (time and billing)
10. User's credit card billed Once the user has called into the cellular network and his credit card has been validated by the network, the user must call the third party and provide the third party with a certain call placement number for the cellular network (having the uniquely configured network transceiver) as well as the user telephone number. Thereafter, the user and the third party disconnect that telephonic communications link. The third party then calls a predetermined third party call placement number for the network. A voice prompts the third party to input the user's cellular telephone number. The third party uses a TOUCH-TONE type phone to generate the correct DTMF signals which represent the user's phone number. Since the user's cellular telephone number has been previously linked to a credit card and that credit card has been validated by the system, a call detail record is formed in the cellular telephone network which provides a correspondence between the incoming third party call and the user's credit card. That call detail record is generally similar to the Call Detail Record Table set forth above. The call detail record notes the time and day and length of that third party call. After the detail record is formed, the cellular network then calls the user's cellular telephone. After the call between the user and the third party is over, the network completes the call detail record. This entails determining the total length of this third party telephone call and rating the call. Thereafter, the cellular telephone network bills the user's credit card.

OUTGOING PROTOCOL AND EVENTS DESCRIPTION

After a credit card has been swiped through the credit card reader, the interface controller validates the card by taking two actions. First, a Luhn's modulus calculation is performed to verify the integrity of the card number read by the system. Secondly, the expiration date is checked against the content of the internal real time clock. If any of these tests fail, a voice message is issued to inform the user of the abnormal condition.

If the aforementioned tests are successful, the controller will compare the number just read against the credit card number stored in its internal memory. If the numbers are found to be different, the content of the internal database will be replaced will be replaced with the new number and a "PHONE USED" flag will be cleared to indicate that the credit card just read has not been used. On the other hand, if both the new number and the previously stored numbers are found to be the same, no further verifying actions are taken.

In either case, the controller waits until a valid phone number is entered via the handset. When an allowable phone is entered, the following events will take place:

| CELLULAR PHONE | CENTRAL SWITCH |
|---|---|
| STEP 1 | |
| The controller takes the phone off hook and dials a ten-digit number (i.e., a 1-800-XYX-YYYY) to contact the central switch location. | The central switch responds by sending a Dial tone for two seconds, as an indication that it is ready to receive data. |
| STEP 2 | |
| Upon receiving the Dial Tone from the switch, the controller will send a string of dual tone multi-frequencies (DTM F) containing the following information: Two tones indicating the number of succeeding tones (not including the number of the checksum tones) plus A variable number of tones containing the cellular phone identification number plus Four tones containing the checksum of the string of DTMF characters. | When the number of tones specified by the first two tones of the incoming string are received, the switch calculates the checksum of the received data. If the checksum is correct, the switch then proceeds to validate the ID number contained in the incoming string. If the ID number is found to be valid, the switch will respond with an ACK tone. Otherwise, a NAK tone will be sent out as an indication that either the received ID or the checksum failed the validation test. |
| STEP 3 | |
| If a NAK tone is received two distinct events may occur: First, if a predefined maximum number of retries has not been exceeded, the step 2 will be repeated. Second, if the maximum number of retries has been exceeded, the controller will terminate the phone call, and a voice message will be played to inform the user about the abnormal condition. | |

-continued

| CELLULAR PHONE | CENTRAL SWITCH |
|---|---|
| If an ACK is received, the controller will proceed with step 4.<br>STEP 4<br>If the "PHONE USED" flag is found to be clear, the controller will send the following information.<br>Two tones indicating the number of succeeding tones (not including the number of the checksum tones)<br>plus<br>A variable number of tones containing information pertaining to the credit card number, expiration date, etc.<br>plus<br>Four tones containing the checksum of the string of DTMF characters.<br>If the "PHONE USED" flag is set, this is an indication that the credit card has already been used by the cellular phone, and the credit card information described in this section should not be sent to the central switch, therefore the controller will proceed to the step number 6.<br>STEP 5<br>If a NAK tone is received two distinct events may occur:<br>First, if a predefined maximum number of retries has not been exceeded, the step 4 will be repeated.<br>Second, if the maximum number of retries has been exceeded, the controller will terminate the phone call, and a voice message will be played to inform the user about the abnormal condition.<br>If an ACK is received, the controller will proceed with step 6.<br>STEP 6<br>The controller sends the following information.<br>Two tones indicating the number of succeeding tones (not including the number of the checksum tones)<br>plus<br>A variable number of tones containing the destination number.<br>plus<br>Four tones containing the checksum of the string of DTMF characters.<br>If the "PHONE USED" flag is set, this is an indication that the credit card has already been used by the cellular phone, and the credit card information described in this section should not be sent to the central switch, therefore the controller will proceed to the step number 6.<br><br>STEP 7<br>If a REQUEST ALL INFORMATION is received, the controller will clear the "PHONE USED" flag and repeat all steps 4, 5, and 6.<br>If a NAK tone is received, two distinct events may occur:<br>First, if a pre-defined maximum number of retries has not been exceeded, step 6 will be repeated.<br>Second, if the maximum number of retries has been exceeded, the controller will terminate the phone call, and a voice message will be | When the number of tones specified by the first two tones of the incoming string are received, the switch calculates the checksum of the received data. If the checksum is correct, the switch then proceeds to validate the credit card number and any other associated information. Notice that the central switch does not need to verify the expiration date, since this check is done by the controller when the credit card information is read.<br>If the credit card information is found to be valid (i.e., availability of credit, etc.), the switch will respond with an ACK tone. Otherwise, a NAK tone will be sent out to indicate that either the credit information or the checksum failed to pass the tests.<br><br><br><br><br><br><br><br><br><br><br><br>When the number of tones specified by the first two tones of the incoming string are received, the switch calculates the checksum of the received data. If the checksum is correct, the switch will respond with an ACK tone, and proceed to dial out the destination number, establish the communication link between the originator and the destination phone, and record all pertinent information for the phone billing.<br>If the checksum fails, a NAK tone will be sent out to request the destination number again.<br>In very rare occasions, the central switch may deem necessary to request all the information again (perhaps because it cannot find a credit card number associated with the phone ID). In such a case, a REQUEST ALL INFORMATION tone will be sent out to the controller, to request the full information from the controller unit. |

| CELLULAR PHONE | CENTRAL SWITCH |
|---|---|
| | -continued |
| | played to inform the user about the abnormal condition. |
| | If an ACK is received, the controller will connect the phone call to continue until the call is terminated or until the END key is pressed on the handset unit. |

THIRD PARTY PROTOCOL AND EVENTS DESCRIPTION

The system supports two modes of operation. In the first mode, phone calls are originated by the user to the location where the Cellular World's phone controller (the IXC) is located. The user may be in a rental car, limousine, and the like.

The second mode of operation arises when the party originating the call is not the one that physically possesses the phone controller (i.e., not the user), but is a third party at a remote location. The third party may originate a call from an ordinary TOUCH-TONE telephone. For this mode of operation to work, it is indispensable that the user's phone controller (the device to which the phone call is being made) already contains validated credit card information (a post-validation call), and that this information has been conveyed to the central switch computer (IXC) by means of a phone call (the first phone call). In other words, the user must make at least one phone call, so that the IXC can register the phone controller identification number (ID) and the credit card number linked to it.

As an illustration of the second mode of operation, assume that the user and the phone controller unit is located in a rental car, and the phone number for this device is 1-305-AAA-BBBB. The user rents this car, then swipes a valid credit card through the card reader device, and places a phone call to another telephone number (1-817-CCC-DDDD). When the phone call is established, the IXC computer saves in its database the ID of the originating device, along with the number of the credit card used to perform this transaction. In this hypothetical scenario, the user informs the person at the remote location that in order to contact him or her the following procedure must take place:

1) The third party will dial a 1-800-XXX-YYYY number of the IXC.
2) When the IXC answers, either through a n human or a machine, the third party will then inform the IXC of the user's phone number (e.g., 1-305-AAA-BBBB).
3) The computer at the IXC location will then verify that the desired phone number is linked to a valid credit card. When the information is verified, the IXC computer will proceed to call the desired location (that is, the 1-205-AAA-BBBB destination number). In contrast, if the information cannot be verified, the third party caller is informed that the desired number is not active and the call should be tried again with a different number.
4) When the cellular phone rings, the controller will take the phone off-hook and transmit an answer tone to the IXC computer, for a pre-defined period of time, such as two seconds.
5) Upon detection of this answer tone, the IXC computer will send an identification code to the cellular phone controller. The controller then checks this ID code against its own internal ID. If both codes match, the controller will allow the phone call to be completed. Otherwise, the controller will hang-up the cellular phone.
6) If the phone call is successfully established between the user and the third party, the IXC will record the duration of the call for billing purposes. When the phone call is terminated, the IXC will call a credit card authorization agency (VISA, MasterCard, etc.) and obtain an authorization number to charge the phone transaction. On the opposite side, if the phone call failed, the IXC will inform the originating device of this irregularity.

As can be seen, the second mode of operation allows a third party at a remote location to contact a user's cellular phone through the credit card calling system described herein.

The credit card interface and controller can be integrated into a unitary cellular phone, that is, as part of the circuitry that detects keys pressed on the keypad, sends and receives DTMF tones in the circuit, sends information to the display, and communicates with the transceiver circuitry. Similar to the stand-alone interface unit 16 in FIG. 1, the central processing unit (CPU) in FIG. 6 is responsible for reading and managing data received from the credit card reader, and communicating with the telecommunications network transceiver, particularly the Inter Exchange Processor (IXC), in order to validate and allow the full telephone link to be established.

Figure 6:
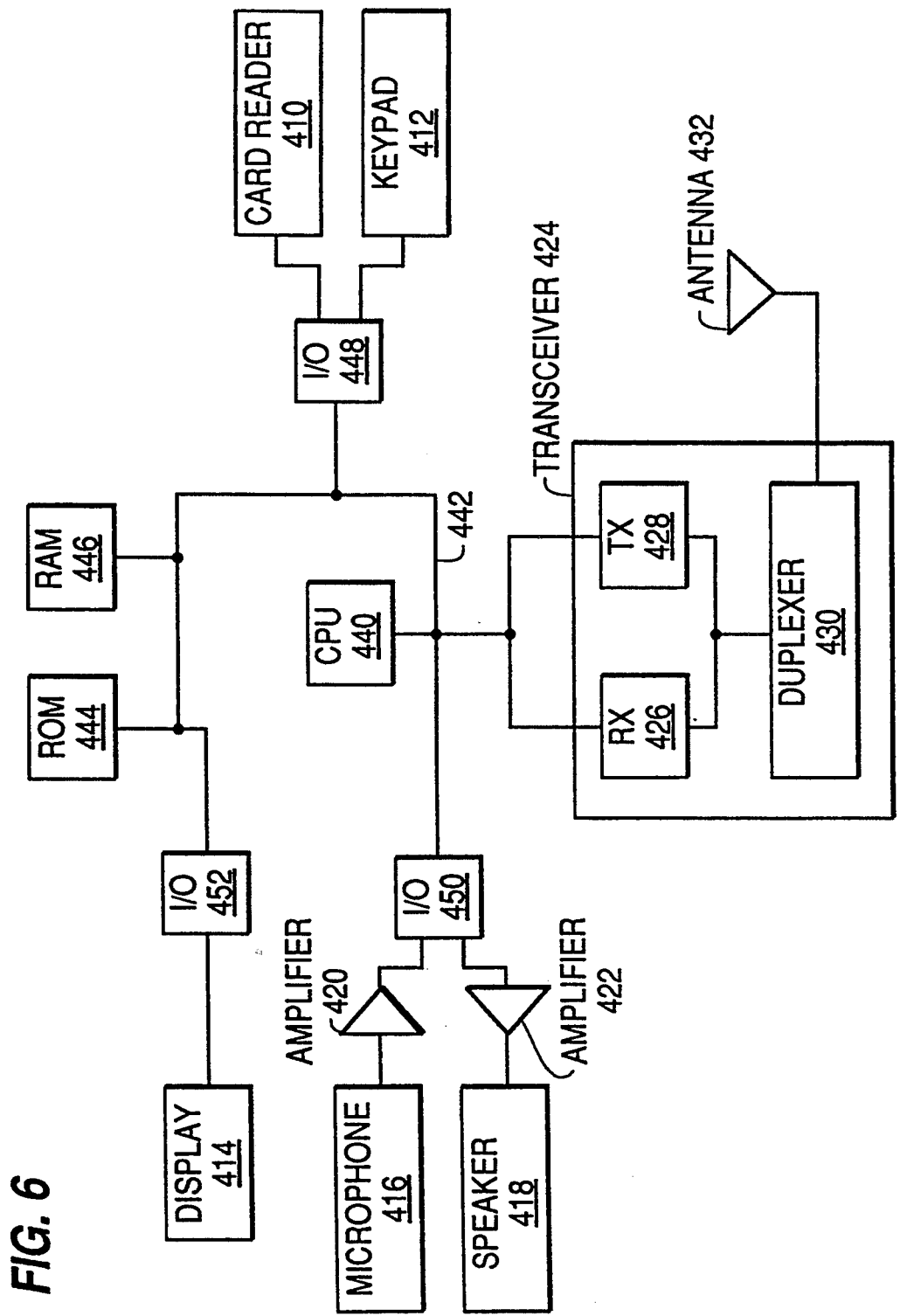
FIG. 6 diagrammatically illustrates the major system components of a cellular telephone having an integrated credit card reader therein.

FIG. 6 diagrammatically illustrates a unitary or one piece cellular phone with a built-in credit card reader 410, user keypad 412 (enabling the user to input destination phone numbers, and Send, End and other function commands commonly found on cellular phone handsets), display 414, microphone 416 and speaker 418. The microphone and speaker signals are amplified and conditioned to the appropriate level and state by amplifiers 420, 422. The unitary phone includes a transceiver 424 having receive unit RX 426 and transmit unit TX 428. These units are coupled to a duplexer 430 such that the signals are sent to and received from antenna 432.

The central processing unit or CPU 440 is coupled to an internal signal and communications bus 442 and to ROM 444, RAM 446, and various Input/Output modules (I/O) 448, 450 and 452. Additionally, the CPU communicates with transceiver 424 thereby sending DTMF signals over the cellular phone carrier to the IXC in the telecommunications network to validate the user's credit card data. Transceiver 424 may further include signal buffers or conditioners.

The claims appended hereto are meant to cover modifications and changes within the scope and spirit of the present invention.

What is claimed is:

1. A credit card cellular telephone calling system for a cellular telephone having access to a cellular telephone system, telecommunications network and a remote supplemental telephonic device coupled thereto, said calling system comprising:

a cellular telephone having a handset and a transceiver unit coupled together via a power and communications bus;

a credit card interface unit coupled to said bus, said interface unit having means for reading and initially validating a credit card;

means for establishing a first telephonic communications link with said telecommunications network and for transmitting to said network credit card data, cellular telephone id data and input telephone number data respectively corresponding to said credit card, to said cellular telephone and to a telephone number input by a user into said handset;

user selectable interface means for displaying a plurality of free call destinations and for permitting selection of one of said plurality of free call destinations, each said free call destination having corresponding free call telephone number data associated therewith, said interface having means for substituting the free call number data for the input telephone number data upon selection by said user;

said network having:

a network transceiver, receiving said credit card data, cellular telephone id data and input telephone number data, and having:

means for ascertaining and recording the validity of said credit card data and said credit card data during said first telephonic communications link and before completion of a further telephonic communications link between said cellular telephone and a telephonic device corresponding to said input telephone number; and, means for routing a call directed to said cellular telephone from said supplemental telephonic device after recording the validity of said credit card data and for recording a length of said call directed to said cellular telephone and billing said credit card for the same.

2. A cellular system as claimed in claim 1 wherein said means for routing has a predetermined telephone number associated therewith and has means for recognizing said cellular telephone id number supplied to it by said supplemental telephonic device.

3. A cellular telephone calling system for a cellular telephone having access to a telecommunications network including a cellular communications component and a credit card verification component comprising:

a cellular telephone having a handset and a transceiver unit coupled together via a communications bus;

a credit card interface unit coupled to said bus, said interface unit having means for reading and initially locally validating a credit card;

means for establishing a first telephonic communications link with said telecommunications network and for transmitting to said network credit card data, cellular telephone id data and input telephone number data respectively corresponding to said credit card, to said cellular telephone and to a telephone number input by a user into said handset;

user selectable interface means for displaying a plurality of free call destinations and for permitting selection of one of said plurality of free call destinations, each said free call destination having corresponding free call telephone number data associated therewith, said interface having means for substituting the free call number data for the input telephone number data upon selection by said user;

said network having:

a network transceiver having means for remotely ascertaining the validity of said credit card data during said first telephonic communications link and before completion of a further telephonic communications link between said cellular telephone and a telephonic device corresponding to said input telephone number.

4. A cellular telephone calling system for a cellular telephone having access to a telecommunications network including a cellular communications component and a credit card verification component comprising:

a cellular telephone having a handset and a transceiver unit coupled together via a communications bus;

a credit card interface unit coupled to said bus, said interface unit having means for reading and initially validating a credit card, means for establishing a first telephonic communications link with said telecommunications network and for transmitting to said network, via a predetermined call placement telephone number, credit card data, cellular telephone id data and input telephone number data respectively corresponding to said credit card, to said cellular telephone and to a telephone number input by a user into said handset;

user selectable interface means for displaying a plurality of free call destinations and for permitting selection of one of said plurality of free call destinations, each said free call destination having corresponding free call telephone number...data associated therewith, said interface having means for substituting the free call number data for the input telephone number data upon selection by said user;

said network having:

a network transceiver, having means for responding to a call placed to said call placement telephone number, and having means for ascertaining the validity of said credit card data during said first telephonic communications link and before completion of a further telephonic communications link between said cellular telephone and a telephonic device corresponding to said input telephone number.

5. A cellular telephone calling system for a cellular telephone having access to a telecommunications network including a cellular communications component and a credit card verification component comprising:

a cellular telephone having a handset and a transceiver unit coupled together via a communications bus;

a credit card interface unit coupled to said bus, said interface unit having means for reading and initially validating a credit card, means for establishing a first telephonic communications link with said telecommunications network and for transmitting to said network, via a predetermined call placement telephone number, credit card data, cellular telephone id data and input telephone number data respectively corresponding to said credit card, to said cellular telephone and to a telephone number input by a user into said handset;

user selectable interface means for displaying a plurality of free call destinations and for permitting selection of one of said plurality of free call destinations, each said free call destination having corresponding free call telephone number data associated therewith, said interface having means for substituting the free call number data for the input telephone number data upon selection by said user; said network having:
a network transceiver having means for ascertaining the validity of said credit card data by establishing a supplemental telephonic communications link with a validation computer system during said first telephonic communications link and before completion of a further telephonic communications link between said cellular telephone and a telephonic device corresponding to said input telephone number.

6. A cellular telephone calling system for a cellular telephone having access to a telecommunications network including a cellular communications component and a credit card verification component comprising:
a cellular telephone having a handset and a transceiver unit coupled together via a communications bus;
a credit card interface unit coupled to said bus, said interface unit having:
a credit card reader obtaining credit card data from a credit card;
means, coupled to said reader, for initially validating said credit card data;
means, coupled to the initial validation means, for prohibiting transmission of a call unless an input telephone number, input into said handset, has a predetermined format and said credit card data is initially validated;
initialization means coupled to said reader for sending to said transceiver unit said credit card data, cellular telephone id data and said input telephone number data, said cellular telephone id data uniquely corresponding to said cellular telephone;
said cellular telephone having means for establishing a first telephonic communications link with said telecommunications network subsequent to receipt of said credit card data, cellular telephone id data and input telephone number data by said transceiver unit; and,
user selectable interface means for displaying a plurality of free call destinations and for permitting selection of one of said plurality of free call destinations, each said free call destination having corresponding free call telephone number data associated therewith, said interface having means for substituting the free call number data for the input telephone number data upon selection by said user; said network having:
a network transceiver which receives said credit card data, cellular telephone id data and input telephone number data during said first communications link, said network transceiver having means for ascertaining the validity of said credit card data prior to the establishment of a further telephonic communications link between said cellular telephone and a telephonic device corresponding to said input telephone number and for establishing said further communications link without disruption of said first communications link.

7. A cellular system as claimed in claim 6 wherein said means for establishing utilizes a predetermined call placement telephone number to call said network transceiver and establish said first telephonic communications link.

8. A cellular system as claimed in claim 6 wherein said means for establishing utilizes predetermined call placement telephone number data to call said network transceiver and establish all telephonic communications links.

9. A cellular system as claimed in claim 6 wherein said interface unit includes means for generating audible user prompts and system condition pronouncements during one or more from the group of obtaining credit card data and initially validating said credit card data.

10. A cellular system as claimed in claim 6 wherein said predetermined format for said input telephone number is a long distance format.

11. A cellular system as claimed in claim 6 wherein said credit card interface unit includes programmable means for placing free, non-credit card calls to a plurality of destinations, said programmable means being programmable from said handset of said cellular telephone.

12. A cellular system as claimed in claim 6 wherein said credit card interface unit includes programmable means for electronically blocking predetermined classes of input telephone number data, said programmable means being programmable from said handset of said cellular telephone.

13. A cellular system as claimed in claim 6 wherein said means for ascertaining the validity of said credit card operates in real time with said first telephonic communications link.

14. A cellular system as claimed in claim 6 wherein said credit card data is stored in memory at said network transceiver.

15. A cellular system as claimed in claim 6 wherein said interface unit includes means for routing all telephone calls associated with said input telephone number data to a network transceiver node having a unique call placement telephone number associated therewith such that said means for establishing said first telephonic communications link always utilizes said call placement number data whenever it uses said input telephone number data.

16. A cellular system as claimed in claim 15 wherein said network transceiver includes recordkeeping means for storing information relating to said credit card data, said cellular telephone id data and validation data, and includes means for correlating all calls associated with a respective cellular telephone id data with said credit card data.

17. A cellular system as claimed in claim 15 wherein said user selectable interface includes free call destinations and associated telephone number data from two or more from the group of a 911 emergency, a restaurant, a car rental company, and a recreational sports club call destination.

18. A cellular system as claimed in claim 17 wherein said interface means includes means for blocking chargeable calls from said cellular telephone if said credit card data is not validated by said initial validation means and said means for ascertaining validity at said network transceiver.

19. A cellular system as claimed in claim 18 wherein said interface unit includes means for generating audible user prompts and system condition pronouncements during one or more from the group of obtaining credit card data, initially validating said credit card data and upon activation of said means for limiting.

20. A cellular system as claimed in claim 6 wherein said further communications link is inclusive within said first communications link.

21. A cellular system as claimed in claim 20 wherein said interface unit includes call clearance means for determining the accuracy of transmission of data to said network transceiver unit, for confirming validity of said credit card data and for sending said input telephone number data and said cellular telephone id data to said transceiver unit, said network transceiver including handshake communications means for confirming accurate receipt of data from said call clearance means and for acknowledging validation of said credit card data by said means for ascertaining, said call clearance means sending said cellular telephone id data and said telephone number input data for all calls to said network subsequent to confirmation of validity.

22. A cellular system as claimed in claim 21 wherein said means for ascertaining the validity of said credit card data as part of said network includes means for establishing a supplemental telephonic communications link with a validation computer system in order to ascertain the validity of said credit card data.

* * * * *